(12) United States Patent
Mangal

(10) Patent No.: US 7,113,582 B1
(45) Date of Patent: Sep. 26, 2006

(54) SYSTEM FOR CALLER CONTROL OVER CALL ROUTING PATHS

(75) Inventor: Manish Mangal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 338 days.

(21) Appl. No.: 10/352,633

(22) Filed: Jan. 27, 2003

(51) Int. Cl.
*H04M 7/00* (2006.01)
(52) U.S. Cl. .............................. 379/220.01; 379/221.02
(58) Field of Classification Search ........... 379/220.01, 379/221.01, 219, 196, 221.02
See application file for complete search history.

(56) References Cited

U.S. PATENT DOCUMENTS

| | | | | |
|---|---|---|---|---|
| 5,745,480 | A * | 4/1998 | Behtash et al. | 370/252 |
| 5,784,457 | A * | 7/1998 | Haba | 379/421 |
| 6,330,316 | B1 * | 12/2001 | Donak et al. | 379/196 |
| 6,373,839 | B1 * | 4/2002 | Clark et al. | 370/352 |
| 6,594,277 | B1 * | 7/2003 | Chiang et al. | 370/465 |
| 6,683,853 | B1 * | 1/2004 | Kannas et al. | 370/237 |
| 6,751,477 | B1 * | 6/2004 | Alperovich et al. | 455/560 |
| 6,775,270 | B1 * | 8/2004 | Rhodes et al. | 370/352 |
| 6,856,612 | B1 * | 2/2005 | Bjelland et al. | 370/338 |
| 2001/0005382 | A1 | 6/2001 | Cave et al. | |
| 2002/0004379 | A1 | 1/2002 | Gruhl et al. | |
| 2002/0114305 | A1 | 8/2002 | Oyama et al. | |
| 2002/0145924 | A1 * | 10/2002 | Beckwith | |
| 2002/0147828 | A1 * | 10/2002 | Chen et al. | |
| 2002/0152319 | A1 * | 10/2002 | Amin et al. | |
| 2003/0039237 | A1 * | 2/2003 | Forslow | |
| 2003/0074443 | A1 * | 4/2003 | Melaku et al. | |
| 2004/0037264 | A1 * | 2/2004 | Khawand | |
| 2004/0064555 | A1 * | 4/2004 | Cuny et al. | |
| 2004/0114604 | A1 * | 6/2004 | Belgardt et al. | |

OTHER PUBLICATIONS

"Softswitch Model Drives New Age of Customized Communication," A CommWorks Position Paper, CommWorks a 3Com company, www.commworks.com, 7 pages.
Interntional Softswitch Consortium, http://www.softswitch.org/educational/tac_gaq.asp, Nov. 7, 2002, pp. 1-4.
CommWorks Softswitch, CommWorks a 3Com company, 4 pages.
Lakshmi-Ratan, "The Lucent Technologies Softswitch-Realizing the Promise of Convergence," Bell Labs Technical Journal, Apr.-Jun. 1999, pp. 174-195.
McGarvey, "Cutting the Cord," Winphoria networks, http://www.winphoria.com/news_03-20-2001-a.html., Mar. 20, 2001, 2 pages.
Telephony, http://currentissue.telephonyonline.com/newsarticle.asp?Newsarticleid=292295&SiteID=3&m . . . , Winphoria unveils new Softswitch, 1 page.

(Continued)

*Primary Examiner*—William J. Deane, Jr.

(57) ABSTRACT

A system for managing communications between a first node and a second node in a telecommunication network. Communication normally flows between the first node and the second node via a first communication link in the network. The flow can be re-routed, under a user's control, via a second communication link that may be less expensive or have a lower QoS. A user sends a control signal into the network that indicates the second communication link between the first node and the second node should be used for a subsequent telecommunication connection. In response to the control signal and an address signal that indicates a called station, the system establishes the telecommunication connection between the calling station and the called station via the second communication link.

21 Claims, 4 Drawing Sheets

OTHER PUBLICATIONS

Leveraging Packet Networks to Carry Voice, Transparent Trunking, 3Com, 2 pages.

Aslam, "Switching and Signaling—The New Architecture," Lucent Technologies UK, 5 pages.

"Lucent Softswitch—Internet Call Diversion (ICD) Solution," Lucent Technologies, Bell Labs Innovations, 3 pages, http://www.lucent.com/products/solution/0,,CTID+2014-STID+10253-SOID+949-LOCL+1,0 . . .

"Lucent Softswitch," Lucent Technologies, Bell Labs Innovations, 4 pages, http://lucent.com/products/solution/o,,CTID+2014-STID+10253-SOID+1360-LOCL+1, . . .

Lucent Softswitch, "Lucent Softswitch—Driving Circuit to Packet Convergence," Lucent Technologies, Bell Labs Innovations, 2 pages.

Franklin et al., "Softswitch Applications in Wireless Core Networks," International Softswitch Consortium, Wireless Working Group, www.softswitch.org, pp. 1-21 Apr. 18, 2002.

* cited by examiner

SYSTEM FOR CALLER CONTROL OVER CALL ROUTING PATHS

BACKGROUND

1. Field of the Invention

The present invention relates to telecommunications and, more particularly, to the routing of calls over a telecommunication network.

2. General Background

Unspecialized data networks, such as the Internet, have grown in size and scope to the point where they can provide a viable alternative transport system to legacy communications transport media, such as the public switched telephone network (PSTN). Even voice communications, which lead to the development of the PSTN, can now be carried over data networks. Such use of data networks to carry voice is generally known as voice-over-packet service, because it involves using a packet-switched data network for at least a portion of a telephone call connection. In typical carrier-class voice-over-packet systems, the transport media used for any given communication link of a call is transparent to users, especially where the users have not willingly selected an inexpensive alternative to legacy, end-to-end telephone service (for example, when users have made an IP call with a non-standard telephone and expect delays, jitter, and reduced voice quality).

In a typical telecommunications system, calls or telecommunication connections are routed strictly as dictated by the network entities that handle the connection, such as switches and gateways. Regardless of the medium used, if the call is "typical", in that the caller expects the call to be indistinguishable from a circuit-switched end-to-end connection, the quality of service (QoS) of the call should be relatively high. A high QoS, relatively speaking, is one that has bandwidth, latency, and jitter specifications that provide connection quality equivalent to point-to-point digital private lines. A telecommunication system that operates this way can be unnecessarily expensive, however, and can place a higher than necessary load on system resources if the system's users would be content with lower QoS (such as the QoS that corresponds to Class of Service 2, 3, or 4 for example) for certain types of calls, such as for text messaging applications or short-duration voice calls, and others.

SUMMARY

Wireless phone users may be especially sensitive to the per-minute cost of a call, and may therefore be quite willing to make at least some of their calls and send text messages using connections with a QoS that is lower than that offered by end-to-end connections, if the lower QoS costs less. Accordingly, a system that gives users some control over the routing (and hence, the cost and quality) of telecommunication connections would be desirable.

In one aspect, a method for managing communications between a first node and a second node in a telecommunication network is provided. In the network, communication normally flows between the first node and the second node via a first communication link, but the network includes a second link between the nodes. The method includes receiving, from a calling station communicatively coupled to the first node, a control signal that indicates the second communication link should be used for a telecommunication connection. Although the calling station is communicatively coupled to the first node, it is not necessary for the control signal to pass directly from the calling station to the first node.

The method also includes receiving, from the calling station, an address signal (such as dialed digits) that indicates a called station. Once the control signal and the address signal have been received, the telecommunication connection can be established between the calling station and the called station via the second communication link, in response to receiving the control signal and the address signal.

In another aspect, a system for managing communications between a first node and a second node in a telecommunication network is provided. In the system, communication normally flows between the first node and the second node via a first communication link, but the network includes a second communication link between the nodes. The system also includes a processor, data storage, and a set of instructions stored in the data storage and executable by the processor to receive, from a calling station communicatively coupled to the first node, a control signal that indicates the second communication link should be used for a telecommunication connection.

The instructions are further executable to receive, from the calling station, an address signal that indicates a called station. In response to receiving the control signal and the address signal, the system can establish the telecommunication connection between the calling station and the called station via the second communication link.

BRIEF DESCRIPTION OF THE DRAWINGS

Presently preferred embodiments of the invention are described below in conjunction with the appended figures, wherein like reference numerals refer to like elements in the various figures, and wherein.

DETAILED DESCRIPTION OF THE DRAWINGS

In an exemplary embodiment of the presently described system, a user can select a routing path when initiating a telephone call. The user might select a particular routing path, for example, when the quality of the connection is less important than with other calls, such as when the user is sending a text message or making a short-duration call where top voice quality is relatively unimportant. Because such calls would presumably be made less often than normal calls, the system default (i.e., the normal communication flow) could be to route all calls over legacy-type end-to-end connections, and to route calls via an alternate path only when users specify.

Calls that a user selects for alternate routing could be connected between communication nodes via a second, alternative communication link that may (or may not) provide lower quality, lower cost, or both. The alternative communication link could include, for example, a packet-switched network such as the Internet or a proprietary data transport network. Thus, calls that are re-routed at the user's preference may be converted from time-domain multiplex (TDM) format to IP or another suitable packet switching protocol.

The alternative routing of calls may not always result in a lower QoS because the quality of the connection can be influenced by many factors, such as network congestion, the specific packet-switching network used, the number of hops, and QoS routing techniques that affect the priority of data streams being transported relative to other communications. The system can be used in conjunction with packet switching QoS techniques such as Diffserv or multiprotocol label switching, to name a few. Such techniques can improve the quality of calls that are routed via the alternative path, but they are not necessary to the operation of the present system because many calls may not even be routed via packet-switching networks. Furthermore, although the present system is described as it would be implemented in a voice communications network, the novel features of the system are not so limited to such use; instead, the system may be employed wherever user selection of a communications routing path is desired.

Figure 1:
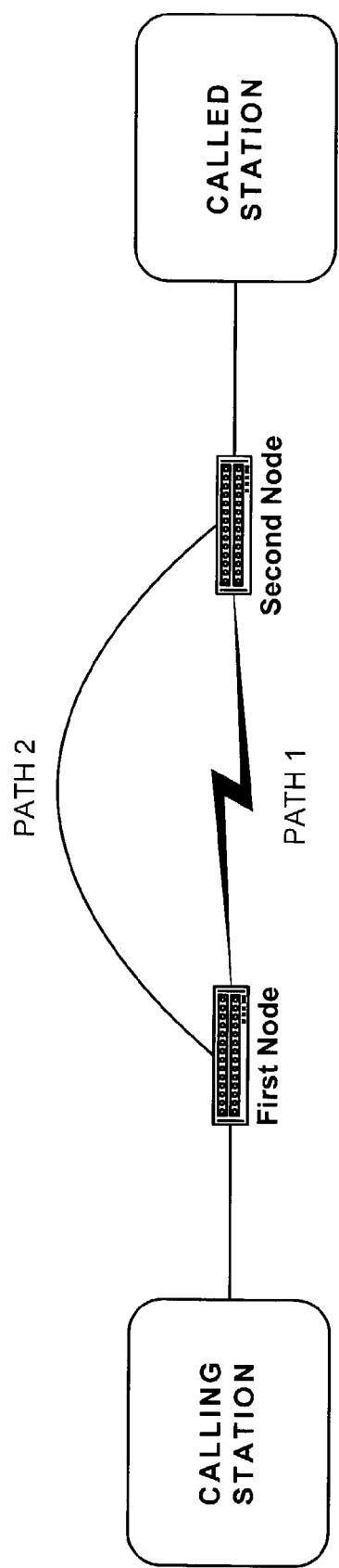
FIG. 1 illustrates the basic principle of operation of the present system.

Referring now to the drawings, FIG. 1 illustrates the basic principle of operation of the present system. In a "normal" call, where a user doesn't specify an alternate call routing path, communication will flow from the calling station to the called station via path 1, which may be or include a circuit-switched connection (e.g., an end-to-end time slot). When a user specifies that a lower cost or quality connection is desired, the system routes connections via path 2. Note that the direction of communication in FIG. 1 is unimportant—the system is equally capable of responding to user routing requests from either end station in FIG. 1, the "calling" station or the "called" station.

Path 2 can be virtually any communications path capable of carrying voice or data communications that provides an alternative to a default path (such as path 1). Path 1 can also be virtually any kind of communications path capable of carrying voice or data communications, as well. Path 2 may preferably comprise a conventional packet-switched network, for example, but it may also comprise wireless transceivers and a communications satellite (not shown). Such a communications satellite may be a conventional, geosynchronous communications satellite or it may be a low-earth orbit satellite, such as an unused Iridium® satellite. Although satellite communication links may be somewhat expensive, it is likely that communications providers with sufficient traffic will be able to negotiate for services at rates that would make using a satellite or satellites financially competitive with legacy transmission lines. This is especially true as providers offer more services (which require more capacity) such as wireless web browsing to their customers.

As another alternative, path 2 may include a multichannel multipoint distribution service (MMDS) link that uses an MMDS omnidirectional antenna.

Path 2 could also include a point-to-point microwave link. Thus, the physical nature of communication link or path 2 is not necessarily critical to the proper functioning of all embodiments of the system; once a signal has been switched back into a conventional telecommunications network (as represented by the links between the stations and the first and second nodes in FIG. 1), the operation (if not the quality) of the system is transparent to users.

Figure 2:
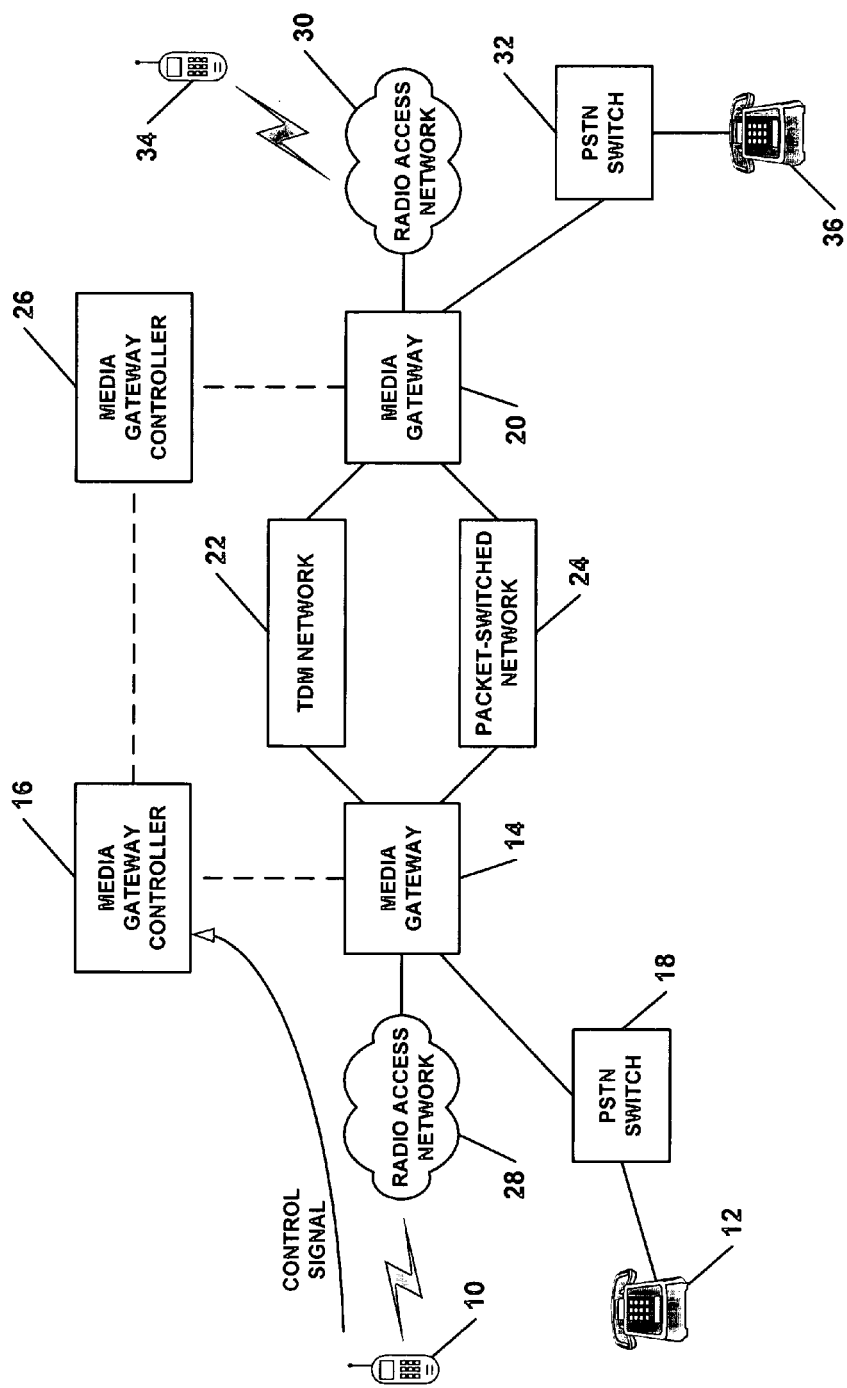
FIG. 2 illustrates a telecommunications network in accordance with the present system.

FIG. 2 illustrates a telecommunications network in which the present system can be implemented. At the core of the system, communications from wireless or landline telephones or other devices are received at media gateway 14 or 20, depending on the direction of communications. Media gateway 14 provides an interface between packet-switched network 24 and radio access network 28, PSTN switch 18, and TDM network 22. Similarly, media gateway 20 provides an interface between packet-switched network 24 and radio access network 30, PSTN switch 32, and TDM network 22. Media gateways 14 and 20 can perform circuit-to-packet conversion of voice and other PSTN-transmitted information for packetization and transmission via packet-switched network 24, and they can similarly perform packet-to-circuit conversion of data from packet-switched network 24 for transmission to any other element or network shown. Media gateways 14 and 20 can provide a range of encoding and compression algorithms such as those recommended by ITU-T, for example, G.711, G.721, G.723, G.723.1, G.726, G.728, and G.729, to minimize the bandwidth burden placed on packet-switched network 24. Media gateways 14 and 20 may also provide echo cancellation and silence suppression.

One or more media gateway controllers, such as media gateway controllers 16 and 26, can coordinate the processes of the media gateways to set up, maintain, and tear down calls. Note that media gateway controllers 16 and 26, as well as media gateways 14 and 20, can be logical or physical entities, and their functionality and other functions (such as SS7 signaling control) can be implemented in various combinations of physical entities, or in a single entity. In addition, media gateway 14 and media gateway 20 could be controlled by a single media gateway controller, and similarly, either media gateway could be controlled by multiple media gateway controllers.

As shown, media gateways 14 and 20 can receive voice communications from either PSTN switches such as switches 18 and 32, or from radio access networks such as radio access networks 28 and 30. Radio access networks 28 and 30 can include base transceiver stations (not shown) that serve a number of cell sites as well as base station controllers (not shown) that aggregate and control traffic for the multiple base transceiver stations.

For purposes of illustration, system operation typical of a call originating from wireless terminal 10 and traversing a network toward media gateway 20 will be described, although the other entities shown as well as others not shown are equally capable of carrying out the same functions. Further, although only two network paths are shown, the system is equally applicable to route communications over three or more possible paths as specified by users.

A user of wireless terminal 10 may send a control signal into the communications system, indicating that the subsequent call should be routed via an alternative path. The user may send the control signal by dialing a predefined feature code, such as *5, for example. The predefined feature code may be sent into media gateway 14 in a separate session before the user dials the called number, or it may be prepended to the called number and sent along with the called number. If the feature code is sent separately, the media gateway 14, media gateway controller 16, or another entity can send an acknowledgement signal to the user. The acknowledgment signal may, in turn, generate a visual or audible indication at wireless terminal 10 or landline telephone 12 indicating the system is ready to receive the called number and that the call will be routed via the alternate path.

It should be noted that a predefined feature code is not the only way a user could signal a desire to have a call routed using a less expensive, "best effort" communication path or link. For example, the system could prompt the user to select a routing path by pressing any button on a telephone or by speaking a command after a call is initiated.

Devices other than wireless terminal 10, such as telephone 12, a wireless PDA, or a computer with a landline or wireless modem, for example, can be used with the present system in place of wireless terminal 10 to signal the user's desire to select the alternate routing path. The control signal can be communicated from media gateway 14 to media gateway controller 16 using, for example, ANSI-41 protocol, although other protocols are possible as well. Media gateway 14 may contain a processor and data storage in which instructions are contained to carry out this signaling upon receiving a predefined feature code or other control code or command from a calling station. It should be noted that the signal path shown between the media gateway and the controller is not the only possible signaling path. For example, PSTN switch 18 may communicate directly with media gateway controller 16 via a separate SS7 node.

Media gateway 14 and media gateway 20 are communication nodes on the network, between which communications can be transported via either a first communication link, TDM network 22, or a second, alternate link, packet-switched network 24. Once the called station's area code or exchange number is known, media gateway controller 16 can locate a peer controller, such as media gateway controller 26, to establish call control for the connection. Media gateway controllers 16 and 26 can exchange call setup messages and other messages associated with call management via session initiation protocol, bearer independent call control protocol, or any other suitable format.

Media gateway controller 16 then signals media gateway 14 to initiate a media session with media gateway 20 to carry the media component of the connection. Media gateway controller 16 also signals media gateway 14 to initiate the session either via TDM network 22 (if no control signal is received) or via packet-switched network 24 if the control signal is received.

As discussed above, exemplary media gateways 14 and 20 can convert between packet format and TDM format. For example, if media gateway 14 receives TDM format communications from radio access network 28 or from PSTN switch 18 and the call is to be routed via network 22, no interworking is necessary. However, if the same call were to be routed via packet-switched network 24, media gateway 14 would packetize the TDM data in a suitable format for transport over network 24 to receiving media gateway 20. Media gateway 20 would then de-packetize the data for output in TDM format (if required) to radio access network 30 or PSTN switch 32, to complete the connection to wireless terminal 34, landline telephone 36, or any other suitable telecommunications device.

Figure 3:
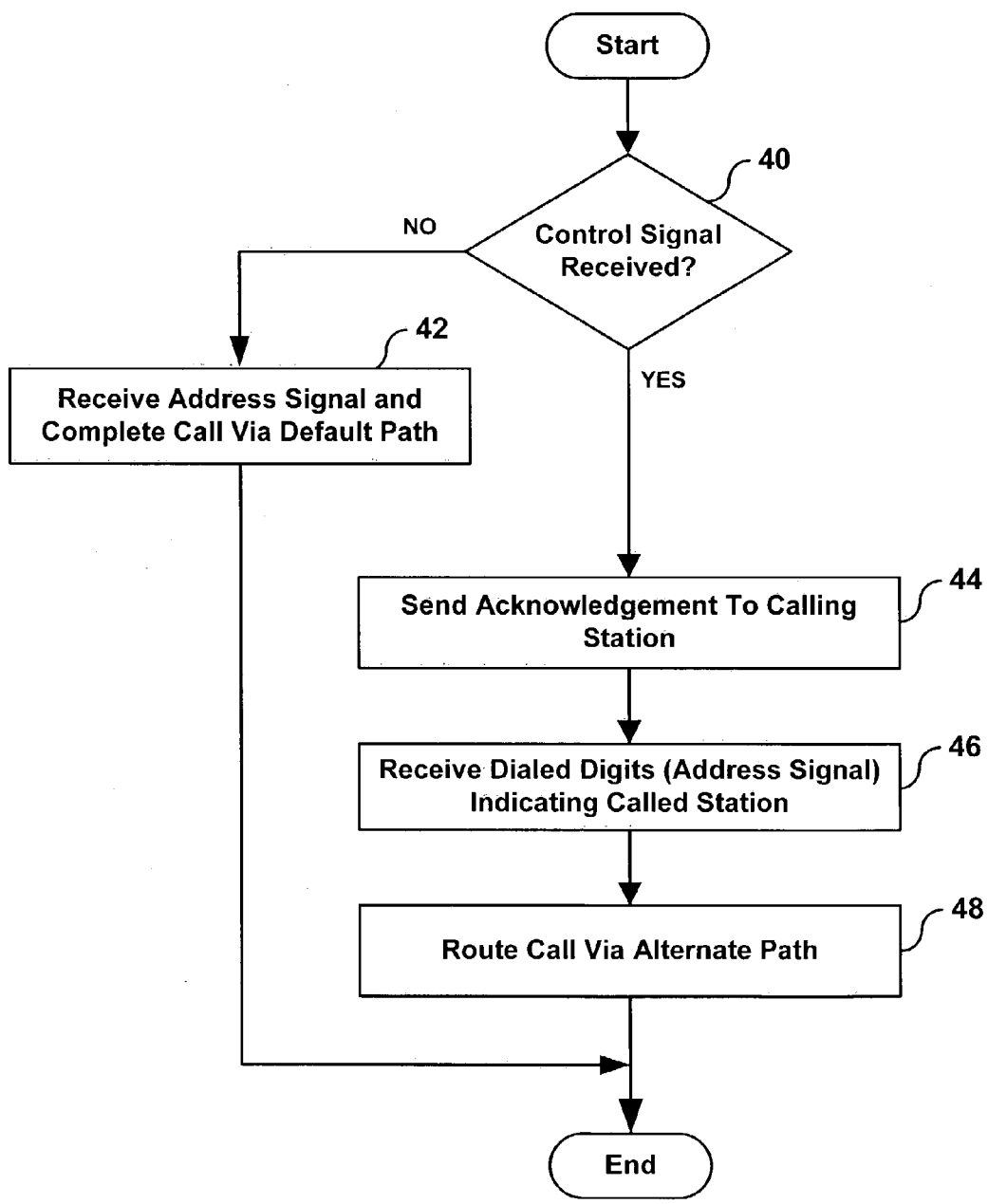
FIG. 3 is a flow chart illustrating the operation of the present system.

FIG. 3 illustrates a set of functional steps that may be carried out in accordance with the present system. At step 40, media gateway 14, media gateway controller 16, or another network entity or device capable of receiving control signals and signaling media gateway 14 can determine if a routing control signal has been received. The control signal is interpreted as a user request to route the ensuing call via the alternative network. If a control signal is not received but the user is making a call, the system can receive dialed digits (i.e., an address signal) and complete the connection to the called station via the default routing path (e.g., TDM network 22 in FIG. 1), as shown at step 42.

At step 44, an acknowledgment can optionally be sent to the user if the control signal is received; such an acknowledgment can indicate that the system is ready to receive dialed digits and route the subsequent call via the alternate communications path. The acknowledgment need not be sent at all for the system to perform properly, however, and the system could function by receiving a control signal together with dialed digits that indicate the called station.

At step 46, the system (via media gateway 14 or media gateway controller 16) receives dialed digits or an address signal indicating the intended station to be called. At step 44, the call is routed to the called station via packet-switched network 24 in response to the control signal and the address signal, and the call is connected.

Figure 4:
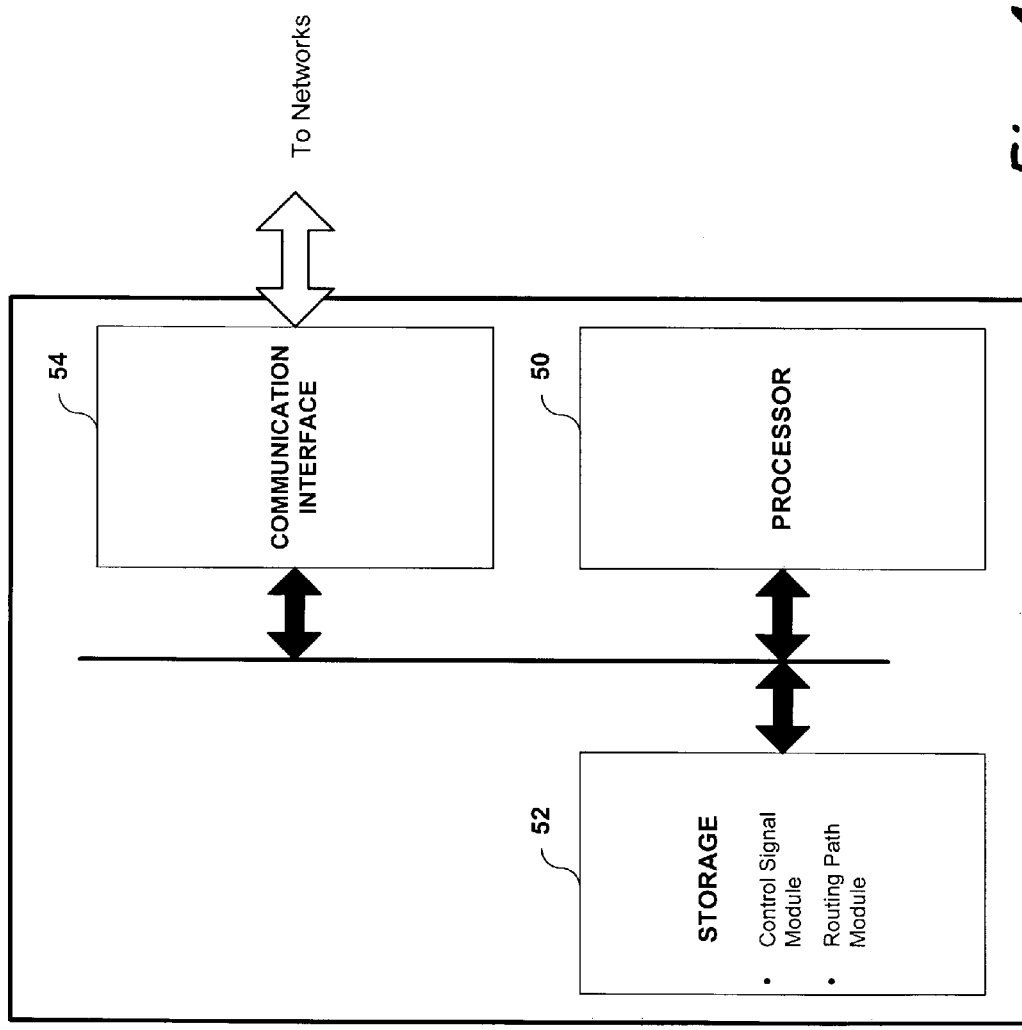
FIG. 4 is a block diagram of a telecommunications apparatus capable of performing the functions of the present system.

FIG. 4 is a simplified diagram illustrating functional blocks that may be included within media gateway 14 or any other telecommunication apparatus in communication with media gateway 14. Generally, media gateway 14 may include a processor 50, a communications interface 54, and storage 52, all communicatively interconnected. Processor 50 may include, for example, one or more integrated circuit microprocessors, and storage 52 may be a ROM, flash memory, non-volatile memory, optical memory, or other suitable memory. Alternatively, the functions described herein could be implemented using a device having a memory and processor contained in one integrated circuit.

Storage 52 may include more than one physical element, and may also include a number of software modules that are executable by processor 50 to carry out various functions described herein. These modules may include, but are not necessarily limited to, a control signal module to monitor for and receive control signals from users, and a routing path module to control which routing path is used for calls. The functionality of the various elements of media gateway 14 or another entity designed to carry out the functions of the present system can be best understood with reference to the flow chart of FIG. 3 and the network diagram of FIG. 2, as described above.

The control signal from the user, as well as network communications conducted via TDM network 22 and Packet-switched network 24 are received from and communicated via communications interface 54. Communication interface 54 may also provide the signaling and control interfaces to other network elements such as media gateway controller 16, signaling gateways or controllers (not shown), and the like.

Exemplary embodiments of the present system have been described above. Those skilled in the art will understand, however, that changes and modifications may be made to these embodiments without departing from the true scope and spirit of the invention, which is defined by the claims.

I claim:

1. A method for managing communications between a first node and a second node in a telecommunication network, wherein communication normally flows between the first node and the second node via a first communication link, the method comprising:

receiving, from a calling station communicatively coupled to the first node, a control signal that indicates a second communication link between the first node and the second node should be used for a subsequent telecommunication connection;

sending an acknowledgement message to the calling station in response to receiving the control signal, the acknowledgement message indicating readiness to receive an address signal that indicates a called station;

receiving the address signal from the calling station, after sending the acknowledgement message; and establishing a telecommunication connection between the calling station and the called station via the second communication link in response to receiving the control signal and the address signal.

2. The method of claim 1, wherein the control signal comprises a predefined feature code.

3. The method of claim 1, wherein the second communication link has a lower quality of service than the first communication link.

4. The method of claim 1, wherein the first communication link has a lower quality of service than the second communication link.

5. The method of claim 1, wherein the second communication link comprises a packet-switched link.

6. The method of claim 5, wherein the first communication link comprises a circuit switched link.

7. The method of claim 1, wherein the calling station comprises a wireless terminal.

8. The method of claim 1, wherein the first node comprises a first media gateway and the second node comprises a second media gateway.

9. The method of claim 8, wherein the acknowledgement message indicates that a media gateway controller that controls the first media gateway is ready to receive the address signal.

10. The method of claim 2, wherein the address signal comprises a called number.

11. A method for managing communications between a first media gateway and a second media gateway in a telecommunication network, wherein communication normally flows between the first media gateway and the second media gateway via a first communication link comprising a circuit switched link, the method comprising:
   receiving, from a wireless terminal communicatively coupled to the first media gateway, a predefined feature code that indicates a second communication link comprising a packet switched link should be used for a telecommunication connection;
   sending an acknowledgement message to the wireless terminal in response to receiving the predefined feature code, the acknowledgement message indicating that a media gateway controller that controls the first media gateway is ready to receive an address signal that indicates a called station;
   receiving the address signal from the wireless terminal, after sending the acknowledgement message; and
   establishing the telecommunication connection between the wireless terminal and the called station via the second communication link in response to receiving the predefined feature code and the address signal.

12. A system for managing communications between a first node and a second node in a telecommunication network, wherein communication normally flows between the first node and the second node via a first communication link, the system comprising:
   a processor;
   data storage; and
   a set of instructions stored in the data storage and executable by the processor to:
      receive, from a calling station communicatively coupled to the first node, a control signal that indicates a second communication link between the first node and the second node should be used for a subsequent telecommunication connection;
      send an acknowledgement message to the calling station in response to receiving the control signal, the acknowledgement message indicating readiness to receive an address signal that indicates a called station;
      receive the address signal from the calling station, after sending the acknowledgement message; and
      establish a telecommunication connection between the calling station and the called station via the second communication link in response to receiving the control signal and the address signal.

13. The system of claim 12, wherein the control signal comprises a predefined feature code.

14. The system of claim 12, wherein the second communication link has a lower quality of service than the first communication link.

15. The system of claim 12, wherein the first communication link has a lower quality of service than the second communication link.

16. The system of claim 12, wherein the second communication link comprises a packet-switched link.

17. The system of claim 16, wherein the first communication link comprises a circuit switched link.

18. The system of claim 12, wherein the calling station comprises a wireless terminal.

19. The system of claim 12, wherein the first node comprises a first media gateway and the second node comprises a second media gateway.

20. The system of claim 19, wherein the acknowledge message indicates that a media gateway controller that controls the first media gateway is ready to receive the address signal.

21. The method of claim 10, wherein the predefined feature code is prepended to the called number.

\* \* \* \* \*